455-611 AU 233 EX
FIP8106 XR 3,727,062
T370-3
X5008H

United States Patent
Foster

[11] 3,727,062
[45] Apr. 10, 1973

[54] ACOUSTO-OPTIC INFORMATION TRANSLATION SYSTEM WITH REFERENCE BEAM FOR CONTROL PURPOSES

[75] Inventor: Leigh Curtis Foster, Atherton, Calif.
[73] Assignee: Zenith Radio Corporation, Chicago, Ill.

[22] Filed: Mar. 10, 1972
[21] Appl. No.: 233,645

[52] U.S. Cl. .....250/199, 350/161
[51] Int. Cl. .....H04b 9/00
[58] Field of Search .....250/199; 307/88.3; 350/161

[56] References Cited

UNITED STATES PATENTS 3,485,557 12/1969 De Maria .....350/161

*Primary Examiner*—Albert J. Mayer
*Attorney*—John H. Coult et al.

[57] ABSTRACT

An acousto-optic image-forming system utilizing a spatially coherent light beam includes a Bragg cell modulator and means for generating in the cell a plurality of sound wave patterns effective to diffract the light beam into a like plurality of writing (or display) beams. Each writing beam is modulated with image information independently of all others such that a plurality of lines (or line elements) of information, here disclosed as a line of alphanumeric characters, can be written or displayed with a single scan of the beams. A novel feedback automatic gain control (AGC) system causes the intensity of each beam to be independent of variations in intensity in the remaining beams. The AGC system includes means for producing a reference sound wave pattern which diffracts a separately detectable reference light beam. A photo detector senses variations in the reference light beam and generates a control signal which is fed back to a driver for the Bragg cell modulator to effect the AGC.

5 Claims, 2 Drawing Figures

ACOUSTO-OPTIC INFORMATION TRANSLATION SYSTEM WITH REFERENCE BEAM FOR CONTROL PURPOSES

CROSS-REFERENCE TO RELATED APPLICATION

This applicatiOn relates to, but is no way dependent upon, copending application Ser. No. 179,139, filed Sept. 9, 1971, assigned to the assignee of the subject invention.

BACKGROUND OF THE INVENTION

The present invention relates generally to an information translation system utilizing a beam of spatially coherent light, e.g., a laser beam, and a Bragg acousto-optic cell to display or record alphanumeric or other image information. More particularly, this invention relates to such recording as display systems in which a plurality of light beams generated in the acousto-optic cell by diffraction are independently and simultaneously modulated with image information.

It has been found that optical recording or display systems which utilize a Bragg acousto-optic cell to diffract from a single input light beam a plurality of independently modulated output beams suffer from having the intensity of each output beam dependent upon the cumulative instantaneous intensity of the remaining beams. This condition of interdependence of the output beams results from the fact that the input beam energy is divided at any instant among the diffracted output beams according to the relative signal strengths of the beams (or according to the number of beams which are "ON" in a binary system).

OBJECTS OF THE INVENTION

It is a general object of this invention to provide an improved information display or recording system utilizing in parallel a plurality of light beams derived from a single light beam, each independently modulated with character or other image information.

It is another general object to provide an optical information-translation system utilizing a Bragg acousto-optic cell and associated driver to produce from an input light beam at least one writing or display beam and an acoustically generated reference beam which is employed for control purposes.

It is a less general object of this invention to provide a multiple beam laser information display or recording system of the nature described above, particularly a character generating system, in which the intensity of each light beam is caused to be independent of variations in intensity of the other beams.

BRIEF DESCRIPTION OF THE DRAWINGS

The features of the present invention which are believed to be novel are set forth with particularity in the appended claims. The invention, together with further objects and advantages thereof, may best be understood by reference to the following description taken in connection with the accompanying drawings, in which:

DESCRIPTION OF THE PREFERRED EMBODIMENT

Figure 1:
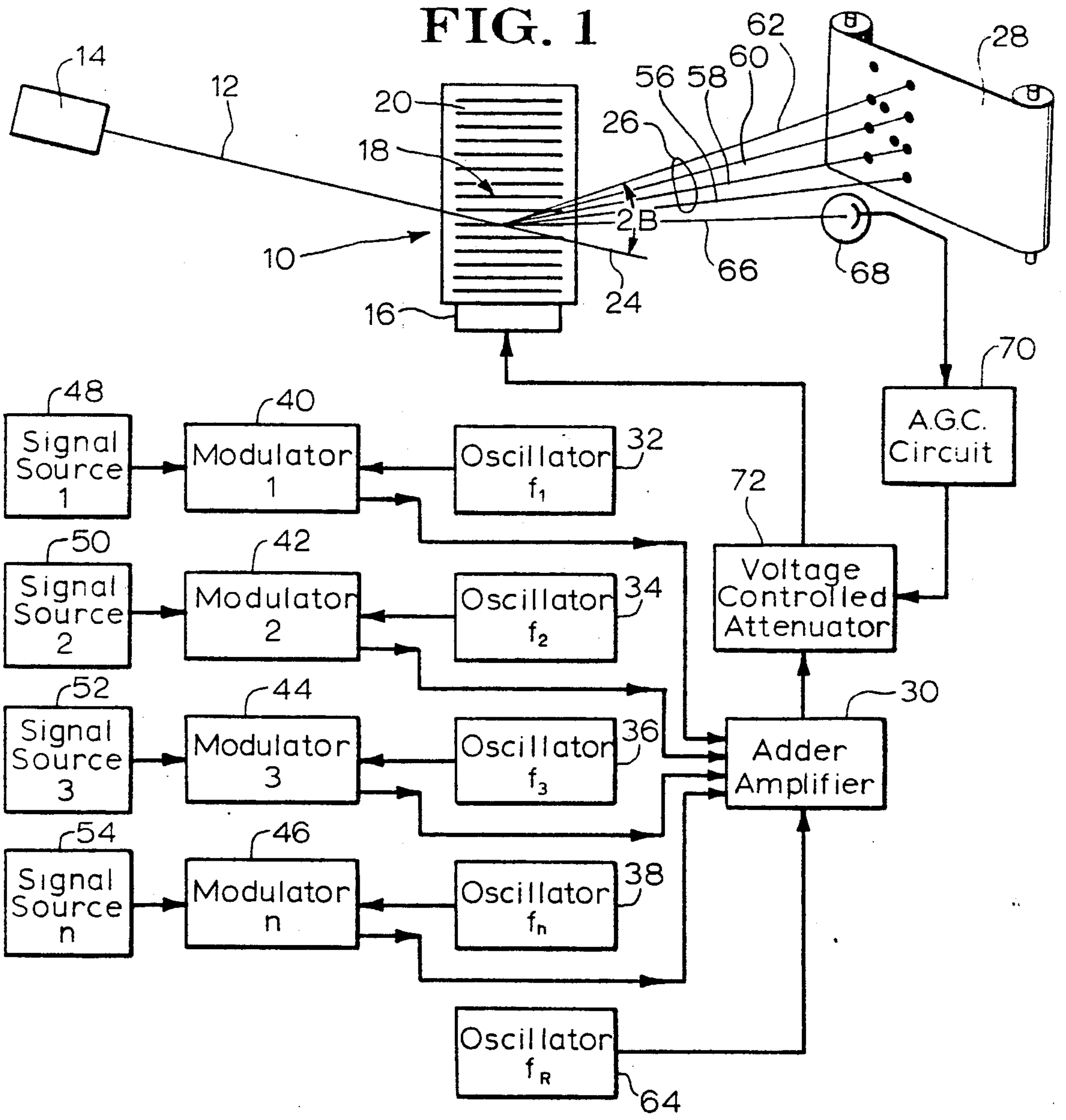
FIG. 1 is a schematic diagram of an image generation system constructed in accordance with the teachings of this information.

FIG. 1 illustrates a preferred implementation of the principles of this invention, comprising a Bragg light-sound interaction cell 10 (hereinafter a "Bragg cell") disposed to receive a spatially coherent input light beam 12, generated for example by a laser 14 or other suitable light source. A transducer 16 responsive to an electrical input signal (described in detail below) launches a pattern of acoustic waves, shown schematically at 18, in the cell medium 20. The medium may be water, glass, or other suitable material.

The light beam 12 is caused to interact in the Bragg cell 10 with acoustic waves 18 at approximately the Bragg angle (defined below), a substantial portion of the light beam 12 being diffracted along a path forming an angle 2B (twice the "Bragg angle") with respect to the undiffracted beam portion 24. Bragg angle B (shown with respect to one diffracted beam only) is determined in accordance with the Bragg relationship:

$\sin B = \pm(\lambda/2W)$, where $\lambda$ is the wavelength of light in the beam 12 and $W$ is the acoustic wavelength.

The diffracted light beams, shown collectively at 26, propagate to an output plane, here shown as a recording plane containing a roll of photosensitive film 28. As will be evident from an examination of the Bragg relationship (stated above), the Bragg angle B is a function of the wavelength of the sound waves and is therefore a function of the frequency of the electrical signals supplied to the transducer 16.

In the illustrated embodiment, the source of signals supplied to the transducer 16 is shown as including an adder-amplifier 30 receiving an input from a selected number of modulators, here shown as being four in number, designated 40, 42, 44 and 46. Modulators 40, 42, 44 and 46 amplitude modulate information received from signal sources 48, 50, 52 and 54, respectively, on electrical carrier signals generated by oscillators 32, 34, 36 and 38. The oscillators generate carrier signals of different, preferably regularly spaced, predetermined frequencies $f_1, f_2, f_3$ and $f_n$, respectively.

Adder-amplifier 30 combines the signals received and applies the resultant composite signal to transducer 16. Responsive to the described composite input signal, transducer 16 generates a plurality of acoustic wave trains representative of the frequency content of the composite input signal applied thereto. Thus, at any given instant during operation of the system, the Bragg cell medium 20 will have propagating within it acoustic wave trains having frequencies corresponding to the frequencies of one or more of the oscillators 32–38.

The input light beam 12 is diffracted by the pattern of acoustic waves 18 in the cell 10 into a plurality of angularly separated output light beams, shown at 56, 58, 60 and 62, corresponding in angular position to the frequencies of oscillators 32–38. The nature of the light-sound interaction described can be understood from a study of such prior art as "Interaction Between Light and Sound" by Robert Adler, IEEE Spectrum, Volume 4, No. 5, U.S. Pat. No. 3,055,258 — Hurvitz, and "Television Display using Acoustic Deflection and Modulation of Coherent Light" by A. Korpel, R. Adler P. Desmares and W. H. Watson, Joint Issue of Proc. IEEE, Volume 54, pages 1429–1437 and Applied Optics, Volume 5, pages 1667–1675 October 1966.

The described system thus causes input light beam 12 to be divided into an undiffracted beam portion 24 and a number of diffracted beams 26. The number, angular position and intensity of the diffracted beams 26 are a function of the number of sound frequencies, their frequency magnitudes, and intensities, respectively.

The system has been thus far described in one dimension only. To create a photographic record, a visual display, or other two-dimensional presentation, the diffracted beams must be moved relative to a recording or display surface, as by deflection of the beams orthogonal to the plane of the beams. The illustrated embodiment employs an alternative method wherein the film 28 is moved orthogonal to the light beams to create a two-dimensional recording.

One application of the subject invention is in the generation of alphanumeric characters. By proper selection of the number of sound frequencies generated (and thus the number of diffracted light beams produced), one or more lines of characters can be produced simultaneously in a single sweep of the fan of beams 26. For a character generator application as depicted, the information impressed upon the oscillators 32-38 is preferably digital. The invention may also be usefully applied in the display or recording of continuous tone images wherein the signals modulating the sound beams are analog in nature.

It has been found that in a system such as is shown schematically in FIG. 1, the nominal intensity of each of the diffracted beams 26 emerging from Bragg cell 10 is not independent of intensity variations in the remaining beams, but rather is quite dependent on the changes in intensity of the remaining beams. The result is that the theoretically expected correspondence between the electrical signals from sources 48–54 and the intensity-modulation of light beams 26 may be distorted.

The problem is illustrated below in more rigorous fashion for systems in which the Bragg cell 10 has a substantially flat frequency response, that is to say, the amplifier signal power necessary to diffract light of a given intensity is substantially the same for each of the frequencies applied to the cell. Assuming the flatness condition, the well-known relationship between the signal voltage V applied to the transducer 16 of cell 10 and the ratio of light diffracted ($I_1$) to the incident light intensity ($I_0$) of the laser beam 12 may be employed:

$$I_1/I_0 = \sin^2 k_1 V$$

where $k_1$ is a constant. This relationship may also be given in terms of the acoustic power P applied to the cell by transducer 16:

$$I_1/I_0 = \sin^2 k_2 \sqrt{P},$$

where $k_2$ is a constant.

The FIG. 1 system is initially adjusted so that the nominal intensity of each of the spots on film 28 is the same, with the diffracted light power being shared equally among the beams. This entails adjusting each of the oscillators 32–38 such that it contributes the same acoustic power to the adder-amplifier 30 and ultimately to the cell 10. In the illustrated embodiment modulators 40–46 act to gate the oscillators so that they are either OFF, or ON at maximum power. Accordingly, the diffracted light beams 26 are either totally ON or OFF. In practice it may be necessary to slightly vary the actual output power contributed by each oscillator from absolute equality with the other oscillators to compensate for beam deviations from the exact Bragg angle and for variations in transducer and amplifier response.

The acoustic power $P$ for each beam with all beams On is approximately equal to $P_T/n$, where $P_T$ is the total acoustic power, and $n$ is the total number of diffracted beams. The ratio of the total intensity $I_T$ of the diffracted light to the intensity $I_0$ of the incident light may then be expressed:

$$I_T/I_0 = \sin^2 k(\sqrt{P_T/n}) \times n = \sin^2 k\sqrt{P_T}, \text{ or}$$

$$k = \frac{\text{arc sin}\sqrt{\frac{I_T}{I_0}}}{\sqrt{P_T}}$$

We may now find the intensity of any single diffracted beam, at any given time, where $m$ is the number of beams on at any given time:

$$\frac{I \text{ of any beam}}{I_0} = \frac{1}{m}\sin^2\left[k\,\frac{\sqrt{m\times P_T}}{n}\right]$$

Substituting for $k$, $$\frac{I \text{ of any beam}}{I_0} = \frac{1}{m}\sin^2\left[\left(\text{arc sin}\,\frac{\sqrt{I_T}}{I_0}\right)\sqrt{\frac{m}{n}}\right]$$

To illustrate the application and significance of the above relationship, a useful simple example is the case of the FIG. 1 system wherein only two of the oscillators are operating, both with a steady equalized maximum output power. Assuming that the system is operated so as to diffract 100 percent of the incident light from beam 12 (so that $I_T/I_0 = 1$), each of the two diffracted beams will have one-half of the total diffracted light intensity, i.e., the ratio $I/I_0$ for each beam is 0.5.

However, when only one of the oscillators is operated (at the same power level as before), and thus only one diffracted beam is ON, i.e., $m = 1$, we find that $$I/I_0 = (1/1)\sin^2[90°\times(\sqrt{1/2})] = \sin^2 90°/\sqrt{2} = 0.8$$

Thus the intensity of the single remaining beam has increased by 60 percent, although the power of the oscillator output signal and the acoustic power corresponding to that beam has not been increased.

The same problem of beam intensity fluctuation occurs with a larger number of diffracted beams; the variations in spot brightness at any given time varies with the number of diffracted beams generated, and this functional relationship is a different one at each level of light diffraction efficiency. This is shown in the FIG. 2 diagram which depicts the different intensity distortion curves which obtain at some representative light efficiencies in a system of the nature shown in FIG. 1.

Figure 2:
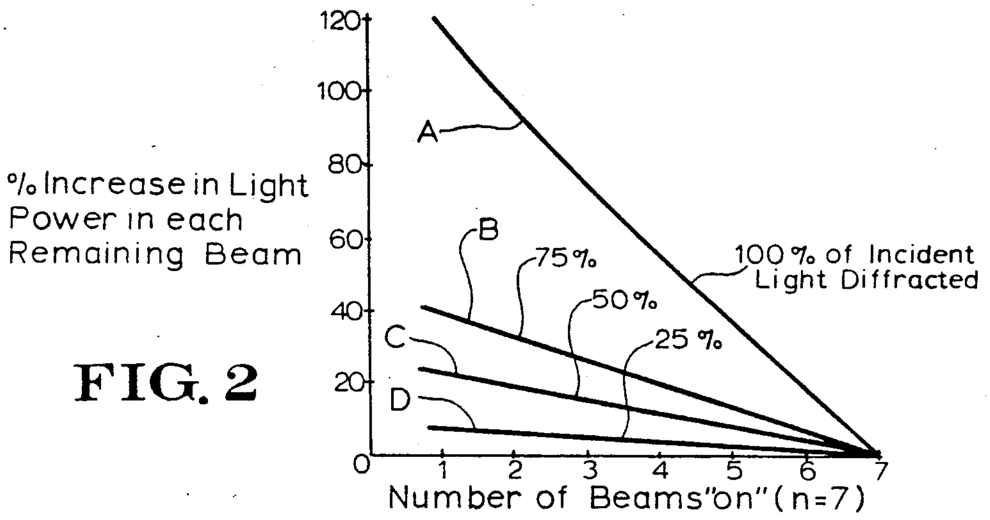
FIG. 2 is a diagram illustrating the manner in which the light power in diffracted light beams varies with the number of light beams activated.

Each curve of FIG. 2 is a plot, for a selected total light diffraction efficiency setting of the Bragg cell 10, of the intensity distortion a light beam, comparing its intensity in the ONE BEAM ON condition with its intensity in the ALL BEAMS ON condition, as a function of the number of beams which are ON. The intensity distortion is given as a percentage change in intensity from the case when all beams are ON. The FIG. 2 diagram gives information for a character generation system employing seven diffracted beams ($n = 7$).

For example, if the cell is operated at 100 percent diffraction efficiency, the distortion when only one beam is ON is such that the light intensity for that beam increases 119% over its value when all beams are ON. Similarly, when three beams are ON, each beam increases 71 percent in light intensity compared to their intensity when all seven beams are ON. The curves have been determined for seven diffracted beams and for cell diffraction efficiencies of 100 percent (Curve A), 75 percent (Curve B), 50 percent (Curve C) and 25 percent (Curve D); similar curves can be derived for other cases when fewer or greater numbers of beams or other values of cell efficiency are used.

The curves show a deviation from linearity and make clear the difficulty of utilizing a system such as FIG. 1 for information translation. Note that if the cell 10 does not have a flat frequency response characteristic as above assumed, no such simple functional relationship between the number of beams ON and the intensity may be established, since then not only the number of beams ON at a given time, but also the particular beams which are ON, must be considered.

According to this invention automatic gain control (AGC) means are provided for minimizing the described variations in beam intensity as a function of changes in the cumulative intensity of the beams ON at any instant (in the present embodiment this translates to a function of the number of beams ON). In the illustrated embodiment the automatic gain control means includes means for producing a reference carrier signal of constant amplitude, shown in FIG. 1 as comprising a constant output reference oscillator 64, the output of which is fed to adder-amplifier 30, and photo-responsive means disposed to intercept and detect a reference light beam 66 produced by the reference sound signal. The output of the photoresponsive means is used to control the intensity of each of the information-bearing beams 26 as a function of variations in the cumulative intensity of the remaining information-bearing beams.

The photoresponsive means is shown as including a photodetector 68 positioned in the path of the reference light beam 66 for supplying a control signal to an AGC circuit 70. The AGC circuit 70 in turn controls a voltage-controlled attenuator 72 which effectively regulates the output of the adder-amplifier 30. The AGC circuit 70, the attenuator 72 and the manner in which the output of the adder-amplifier 30 is controlled thereby, may be drawn from well-known electronic circuit design principles and techniques.

By this invention a feedback AGC circuit is provided which monitors the instantaneous cumulative intensity of the diffracted information-bearing beams and produces a control signal for adjusting the output of the amplifier 30 so as to maintain the intensity of each beam constant for a given input signal level.

While particular embodiments of the invention have been shown and described, it will be obvious to those skilled in the art that changes and modifications may be made without departing from the invention in its broader aspects and, therefore, the aim in the appended claims is to cover all such changes and modifications as fall within the true spirit and scope of the invention.

I claim:

1. An acousto-optic information-translation system utilizing a spatially coherent input light beam, comprising:

means for generating a plurality of frequency-spaced electrical information carrier signals and a reference carrier signal at a frequency different from the frequency of any of said information carrier signals;

signal processing means for independently modulating said plurality of carrier signals in accordance with respective information signals and for combining said signals to produce a composite signal;

beam control means including a Bragg light-sound interaction cell interposed in the path of said light beam and including transducer means for receiving said composite signal to produce acoustic wave patterns in said cell corresponding to said information and reference carrier signals effective to cause at least part of said light beam to be diffracted into a corresponding plurality of angularly discrete information-bearing light beams and a reference beam;

electro-optic control means coupled to said beam control means including photoresponsive means disposed to intercept and detect a characteristic of said reference light beam for controlling one or more of said information-bearing beams as a function of said detected characteristic of said reference beam.

2. An acousto-optic information-translation system utilizing a spatially coherent input light beam, comprising:

means for producing a plurality of frequency-spaced electrical information carrier signals;

a corresponding plurality of signal modulating means for modulating respectively said plurality of carrier signals in accordance with discrete information signals;

means for producing a reference carrier signal at a frequency different from the frequency of any of said information carrier signals;

signal combining means for combining said information and reference carrier signals to produce a composite signal;

a Bragg light-sound interaction cell interposed in the path of said light beam and including transducer means for receiving said composite signal to produce acoustic wave patterns in said cell corresponding to said information carrier signals, at least part of said light beam being diffracted into a corresponding plurality of angularly discrete information-bearing light beams and a reference beam;

automatic gain control means including photoresponsive means disposed to intercept and detect said reference light beam for controlling the intensity of each of said information-bearing beams as a function of variations in the cumulative intensity of the remaining information-bearing beams.

3. A system as in claim 2, in which said automatic gain control means comprises means for adjusting the intensity of each of said output beams in a sense corresponding to changes in the total intensity of the remaining beams.

4. A system as in claim 3, in which said automatic gain control means comprises means for attenuating each of said output beams in response to a diminution in the total intensity of the remaining beams.

5. A method of imparting information from a plurality of independently varying electrical information signals to a like plurality of output light beams derived from a spatially coherent input light beam, comprising:

generating a plurality of frequency-separated carrier signals corresponding in number to said plurality of information signals and a reference carrier signal having a frequency different from said information carrier signals;

modulating each of said information carrier signals in accordance with a respective one of said information signals;

Bragg-diffracting at least part of said input beam into a corresponding plurality of angularly-discrete output light beams, each modulated in accordance with a respective one of said information signals, and a reference beam angularly separate from said modulated output light beams;

photodetecting said reference beam to generate a control signal; and utilizing said control signal to maintain the nominal signal intensity of each of said information-bearing output light beams substantially independent of variations in the intensity of the remaining beams.

* * * * *